(12) United States Patent
Crist et al.

(10) Patent No.: US 6,520,452 B1
(45) Date of Patent: Feb. 18, 2003

(54) DEICER FOR AIRCRAFT

(75) Inventors: James Crist, Canton, OH (US); James Putt, Doylestown, OH (US); Terry Sluss, Louisville, OH (US)

(73) Assignee: The B. F. Goodrich Company, Charlotte, NC (US)

( * ) Notice: Subject to any disclaimer, the term of this patent is extended or adjusted under 35 U.S.C. 154(b) by 77 days.

(21) Appl. No.: 09/710,676

(22) Filed: Nov. 9, 2000

Related U.S. Application Data

(60) Provisional application No. 60/226,186, filed on Aug. 18, 2000.

(51) Int. Cl.[7] .............................................. B64D 15/00
(52) U.S. Cl. ................................................. 244/134 A
(58) Field of Search ......................... 244/134 R, 134 A

(56) References Cited

U.S. PATENT DOCUMENTS

| | | | |
|---|---|---|---|
| 4,361,298 A | 11/1982 | Trares et al. ............. | 244/134 A |
| 4,463,919 A | 8/1984 | Bac ........................ | 244/134 A |
| 4,502,153 A | 3/1985 | Lapedes et al. ............ | 2/81 |
| 4,561,613 A | 12/1985 | Weisend, Jr. ............. | 244/134 A |
| 4,613,102 A | 9/1986 | Kageorge ................ | 244/134 A |
| 4,687,159 A | 8/1987 | Kageorge ................ | 244/134 A |
| 5,098,037 A | 3/1992 | Leffel et al. ............. | 244/134 A |
| 5,112,011 A | 5/1992 | Weisend et al. ........... | 244/134 A |
| 5,164,242 A * | 11/1992 | Webster et al. ............. | 156/60 |
| 5,288,355 A | 2/1994 | Leffel et al. ................ | 156/156 |
| 5,304,425 A | 4/1994 | Padgett ...................... | 428/484 |
| 5,310,142 A * | 5/1994 | Weisend, Jr. ............. | 244/134 A |
| 5,337,978 A * | 8/1994 | Fahrner et al. .......... | 244/134 A |
| 5,393,014 A * | 2/1995 | Weisend et al. ........ | 137/625.21 |
| 5,449,133 A | 9/1995 | Ely et al. ................. | 244/134 A |
| 5,449,134 A | 9/1995 | Weisand, Jr. ............. | 244/134 R |
| 5,489,073 A | 2/1996 | Leffel et al. ............. | 244/134 R |
| 5,544,845 A | 8/1996 | Giamati et al. ......... | 244/134 E |
| 5,558,304 A | 9/1996 | Adams .................... | 244/134 A |
| 5,562,265 A | 10/1996 | Rauckhorst, III ....... | 244/134 R |
| 5,609,314 A | 3/1997 | Rauckhorst,III et al. . | 244/134 A |
| 5,743,494 A * | 4/1998 | Giamati et al. ......... | 244/134 A |
| 5,813,631 A * | 9/1998 | Butler et al. ................ | 215/237 |
| 5,845,878 A * | 12/1998 | Racukhorst,III et al. . | 244/134 A |
| 5,921,502 A | 7/1999 | Al-Khalil et al. ........ | 244/134 R |
| 6,247,669 B1 * | 6/2001 | Rauckhorst et al. .... | 244/134 A |
| 6,352,601 B1 * | 3/2002 | Ray ............................ | 156/71 |

FOREIGN PATENT DOCUMENTS

EP 0 595 244 A1 10/1993

OTHER PUBLICATIONS

International Search Report (PCT/ISA/210).

* cited by examiner

*Primary Examiner*—Peter M. Poon
*Assistant Examiner*—Kevin Jakel
(74) *Attorney, Agent, or Firm*—Renner, Otto, Boisselle & Sklar, LLP

(57) ABSTRACT

A deicer is provided for breaking up and removing accumulated ice on an airfoil surface. The deicer includes a bondside surface that is bonded to the airfoil surface, a breezeside surface on which the ice will accumulate, and passage-defining surfaces therebetween. The passage-defining surfaces define a plurality of expansible and contractible inflation passages and include a moisture-impervious coating whereby moisture within the inflation passages will not be absorbed by the surfaces. The bondside, breezeside and passage-defining surfaces may be contained on a deicer panel and means may be provided for introducing inflation fluid to and evacuating inflation fluid from the passages to expand and contract the inflation passages to break up and remove the accumulated ice.

45 Claims, 2 Drawing Sheets

DEICER FOR AIRCRAFT

RELATED APPLICATIONS

This application claims priority under 35 U.S.C. §119(e) to U.S. Provisional Application No. 60/226,186 filed on Aug. 18, 2000. The entire disclosure of this provisional application is hereby incorporated by reference.

FIELD OF THE INVENTION

This invention relates generally as indicated to aircraft deicing equipment and, more particularly, to a pneumatic deicer wherein the surfaces defining inflation passages are appropriately coated to deter undesired moisture absorption.

BACKGROUND OF THE INVENTION

An aircraft may be periodically exposed to conditions of precipitation and low temperatures which may cause the forming of ice on the leading edges of its wings and/or on other airfoils during flight. If the aircraft is to perform sufficiently in flight, it is important that this ice be removed. To this end, various types of aircraft deicers have been developed to address this issue. An aircraft deicer is designed to break up ice accumulations which undesirably tend to form on certain airfoils (such as the leading edges of the aircraft's wings) when the aircraft is operating in severe climatic conditions.

Of particular interest to the present invention is pneumatic aircraft deicers. A pneumatic deicer typically comprises a deicing panel that is installed on the surface to be protected, such as the leading edge of an aircraft wing. One surface of the deicing panel is adhesively bonded to the wing and this surface is referred to as the "bondside" surface. The other surface of the deicing panel is exposed to the atmosphere and this surface is referred to as the "breezeside" surface. For sake of directional clarity, the terms "bondside" and "breezeside" may be used to refer to the location of respective surfaces of the deicer and its components relative to the wing. Specifically, a bondside surface would be the surface relatively closest to the wing and a breezeside surface would be the surface relatively most removed from the wing.

The panel of a pneumatic deicer also includes inner surfaces which define inflatable passages. An inflation fluid, such as air, is repeatedly alternately introduced and evacuated from the passages via tubes or other suitable connection means during operation of the deicer. The cyclic inflation and deflation of the passages causes a change in the bondside surface geometry and surface area thereby imposing shear stresses and fracture stresses upon the sheet of ice. The shear stresses displace the boundary layer of the sheet of ice from the deicer's breezeside surface and the fracture stresses break the ice sheet into small pieces which may be swept away by the airstream that passes over the aircraft wing.

A pneumatic deicer will typically be constructed from a plurality of layers including two passage-defining layers which define the inflation passages. These passage-defining layers are commonly viewed as the carcass of the deicer and/or the deicer panel. One of the passage-defining layers is usually non-deformable and includes a breezeside surface which is a passage-defining surface. The other of the passage-defining layers is deformable and includes a bondside surface which is a passage-defining surface. When the passages are inflated, the passage-defining surfaces are in contact with the inflation fluid.

The carcass layers typically each comprise a fabric ply coated on one side with rubber or another similar coating. For example, the non-deformable layer may comprise a square-woven fabric while the deformable layer may comprise a knit fabric. The carcass is manufactured by sewing the coated fabric layers together with the uncoated fabric surfaces facing each other. Thus, the uncoated fabric surfaces will form the passage-defining surfaces of the deicer.

When the passages are deflated and/or are being deflated, the texture of the uncoated fabric surfaces prevents flow-precluding contact between these surfaces as the inflation fluid is being evacuated from the passages. In other words, the texture of the fabric prevents the entrapment of inflation fluid. Thus, the texture of the uncoated fabric has conventionally been viewed as allowing the air to pass more freely through the carcass during deflation thereby allowing the deicer to "breathe."

When the passages are inflated or are being inflated, the uncoated fabric surfaces are in contact with the inflation fluid (e.g., air) and the coating on the opposite fabric surfaces prevent the escape of inflation fluid from the passages. Accordingly, the adhesion between the coating and the fabric is a significant factor in deicer operability. For this reason, the fabric plies are often treated with an RFL (resorcinol-formaldehyde-latex) dip prior to application of the coating to promote adhesion between the fabric and its coating.

The inventors appreciated that moisture may be present in the inflation fluid whereby water is introduced into the inflation passages during operation of the deicer. The inventors additionally appreciated that moisture absorbed through the uncoated fabric surfaces of the carcass layers may cause a weakening, or even a failure, of the adhesive bond between the fabric and the rubber coating thereby reducing the useful life of the deicer. While an RFL dip may serve to promote adhesion between the fabric and its coating, the strength of adhesion may be reduced by the presence of liquid water, particularly at warmer temperatures.

SUMMARY OF THE INVENTION

The present invention provides a deicer for an aircraft wherein the passage-defining surfaces are coated with a water impervious coating to prevent the absorption of moisture through the fabric plies of the carcass layers.

More particularly, the present invention provides a deicer for breaking up and removing accumulated ice on an airfoil surface. The deicer comprises a bondside surface which is bonded to the airfoil surface, a breezeside surface on which the ice will accumulate, and passage-defining surfaces therebetween. The passage-defining surfaces define a plurality of expansible and contractible inflation passages and include a moisture-impervious coating. The deicer may comprise a deicer panel (which includes the bondside surface, the breezeside surface and the passage-defining surfaces) and means for introducing inflation fluid to and evacuating inflation fluid from the passages. Thus, when the deicer is bonded to an airfoil surface of an aircraft (such as the leading edge of a wing), the expansion and contraction of the inflation passages will break up and remove the accumulated ice.

The deicer panel may comprise a carcass which includes the passage-defining surfaces, such as a carcass formed from a first layer and a second layer which are joined together to form the inflation passages. The first layer may comprise a first fabric ply (such as RFL treated nylon square woven fabric) and the moisture-impervious coating (such as natural rubber) would be on the breezeside surface of the first fabric ply. The second layer may comprise a second fabric ply (such as a RFL treated nylon knit fabric) and the moisture-impervious coating (such as rubber) would be on the bondside surface of the second fabric ply. The coating on the breezeside of the first fabric ply and/or the coating on the bondside of the second fabric ply may be texturized. Additionally or alternatively, the bondside surface of the first fabric ply may also be coated with a moisture-impervious coating and/or the breezeside surface of the second fabric ply may also be coated with a moisture-impervious coating.

These and other features of the invention are fully described and particularly pointed out in the claims. The following description and annexed drawings set forth in detail a certain illustrative embodiment of the invention, this embodiment being indicative of but one of the various ways in which the principles of the invention may be employed.

DRAWINGS

DETAILED DESCRIPTION

Figure 1:
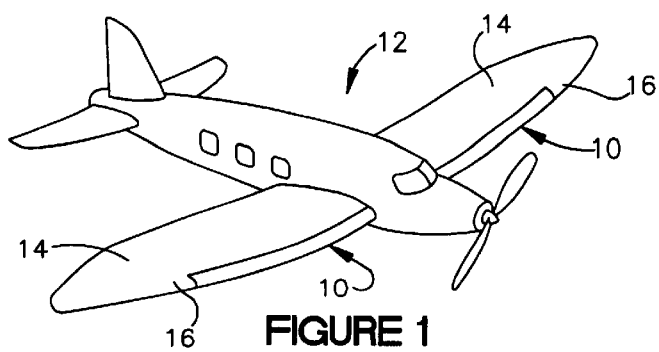
FIG. 1 is a schematic perspective view of a deicer according the present invention, the deicer being shown secured to the leading edge of an aircraft wing.

Referring now to the drawings, and initially to FIG. 1, a deicer 10 according to the present invention is shown installed on an aircraft 12. More particulary, the deicer 10 is shown installed on each of the leading edges 16 of the wings 14 of the aircraft 12. The deicer 10 breaks up ice accumulations which undesirably tend to form on the leading edges 16 of the aircraft wings 14 under severe climatic flying conditions.

Figure 2:
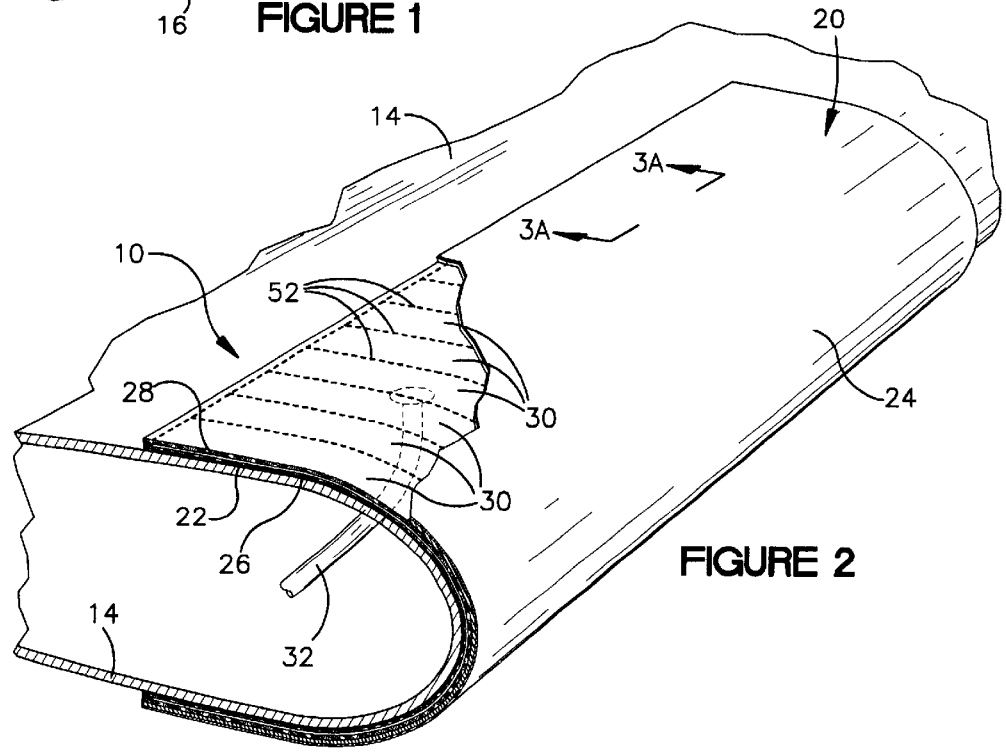
FIG. 2 is an enlarged perspective view of the deicer as shown in FIG. 1 with certain parts broken away.

Referring additionally to FIG. 2, the deicer 10 is shown in more detail. The deicer 10 includes a deicing panel 20 that is installed on the surface to be protected which, in the illustrated embodiment, is the leading edge 16 of the wing 14. One surface of the deicing panel 20, the bondside surface 22, is adhesively bonded to the wing 14. The other surface of the deicing panel 20, the breezeside surface 24, is exposed to the atmosphere. During operation of the aircraft 12 in severe climate conditions, atmospheric ice will accumulate on the deicer's breezeside surface 24.

The panel 20 also includes inner surfaces 26 and 28 which define inflatable passages 30. An inflation fluid (such as air) is introduced and evacuated from the passages 30 via tubes or other suitable connection means 32. In the illustrated embodiment, each of the inflatable passages 30 has a tube-like shape extending in a curved path parallel to the leading edge of the aircraft wing 12. The illustrated inflatable passages 30 are arranged in a spanwise succession and are spaced in a chordwise manner.

Figure 3A:
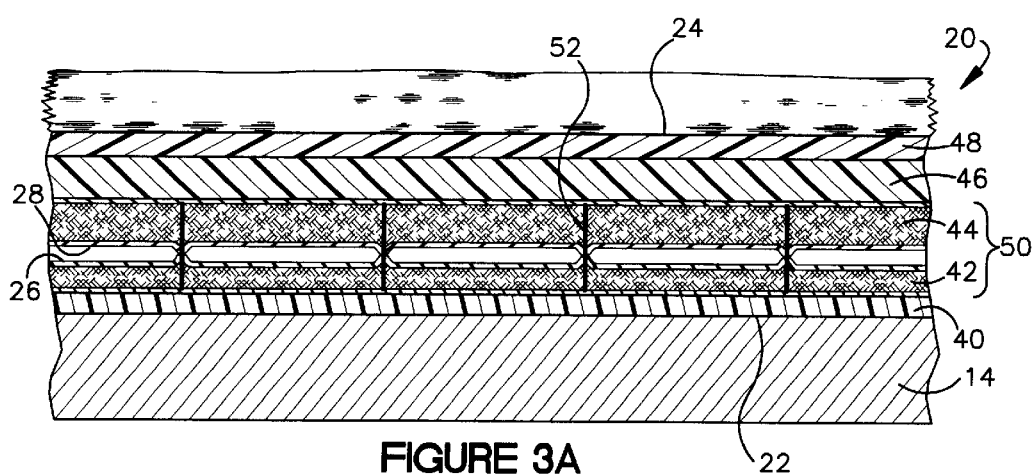
FIGS. 3A and 3B are schematic views of the deicer panel in a deflated state and an inflated state, respectively.
Figure 3B:
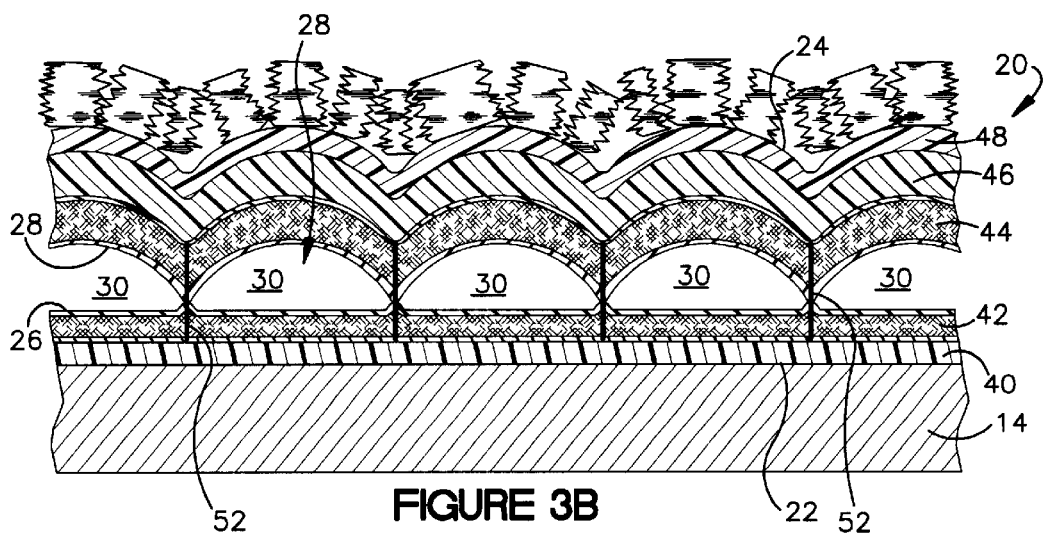

Referring further to FIGS. 3A and 3B, the passages 30 are shown in a deflated state and an inflated state, respectively. When the passages 30 are in a deflated state, the breezeside surface 24 of the deicer panel 20 has a smooth profile conforming to the desired airfoil shape and ice accumulates thereon in a sheet-like form. Also, the passage-defining surfaces 26 and 28 are positioned flush and parallel with each other and may contact each other. (FIG. 3A.) When the passages 30 are in an inflated state, the breezeside surface 24 and the passage-defining surface 28 take on a bumpy profile with a series of parabolic-shaped hills corresponding to the placement of the passages 30. (FIG. 3B.)

The change of surface geometry and surface area that results from the inflation/deflation of the passages 30 imposes shear stresses and fracture stresses upon the sheet of ice. The shear stresses displace the boundary layer of the sheet of ice from the deicer's breezeside surface 24 and the fracture stresses break the ice sheet into small pieces which may be swept away by the airstream passing over the aircraft wing 14 during flight. (FIG. 3B.) It may be noted for future reference that the bondside surface 22 and the passage-defining surface 26 do not change shape or profile during inflation/deflation of the passages 30.

The deicer panel 20 is formed from a plurality of layers or plies 40, 42, 44, 46, and 48. The layer 40 is positioned closest to the aircraft wing 12 and its wing-adjacent surface forms the bondside surface 22 of the deicer panel 20. The layer 42 is positioned adjacent the layer 40 and the layer 44 is positioned adjacent the layer 42. The facing surfaces of the layers 42 and 44 define the passage-defining surfaces 26 and 28, respectively, of the deicer panel 20. The layer 46 is positioned adjacent the layer 44. The layer 48 is positioned adjacent the layer 46 and is farthest from the aircraft wing 12 whereby its exposed surface forms the breezeside surface 24 of the deicer panel 20. During inflation/deflation of the passages 30, the layers 40 and 42 maintain substantially the same smooth shape while the layers 44, 46, and 48 transform between a smooth shape and the bumpy profile shown in FIG. 3B.

The non-deformable layer 40 provides a suitable bondside surface 22 for attachment to the aircraft wing 14 and may comprise Neoprene. As is explained in more detail below, the non-deformable layer 42 and the deformable layer 44 may comprise coated fabric sheets sewn together in a pattern which establishes the passages 30. The deformable layer 46 is provided to facilitate the return of the other deformable layers 44 and 48 to the flush deflated position and may comprise natural rubber. The deformable layer 48 may be made of a material which is resilient and extensible to allow the required expansion/contraction, which enhances the weather resistant properties of the deicer, and which provides a more aesthetically pleasing appearance. A suitable material for the layer 48 would be Neoprene or polyurethane. Securement of the various deicer layers together and to the leading edge of the aircraft may be accomplished by cements or other bonding agents compatible with the materials employed.

Figure 4:
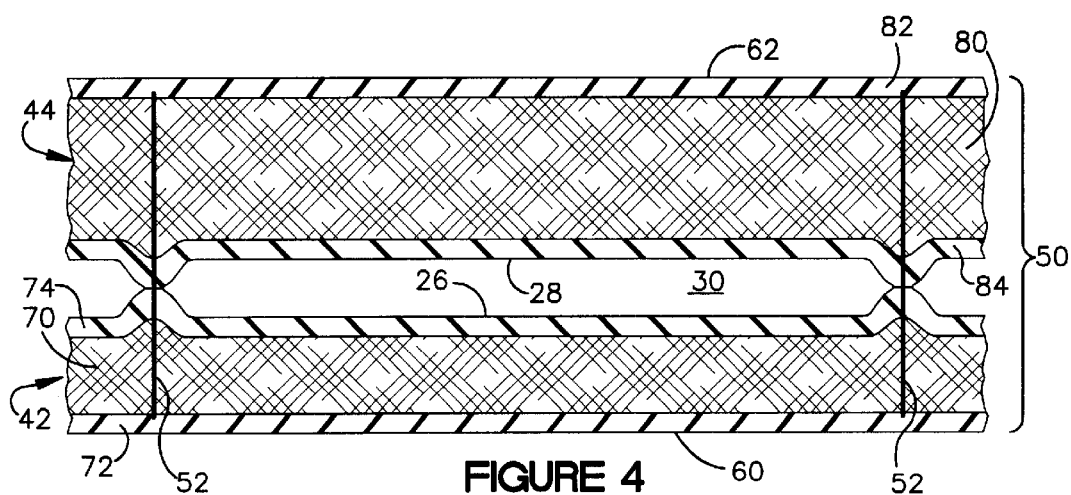
FIG. 4 is an enlarged sectional view of the carcass of the deicer panel.

Referring now to FIG. 4, the passage-defining layers 42 and 44 are shown in more detail. The layers 42 and 44 are commonly viewed as the carcass 50 of the deicer 10 and/or the deicer panel 20. During the manufacture of a deicer panel, the carcass 50 is usually initially made and tested, and then the other layers of the panel 20 (such as layers 40, 46 and 48) are assembled to the carcass 50. Specifically, for example, the layers 42 and 44 are sewn together with stitches 52 to establish the desired inflation passages 30. During subsequent assembly steps in the manufacture of the deicer panel, the assembled layers may be subjected to a final cure. The carcass 50 may be precured during its subassembly to prevent the passage-defining passages from sticking together during the final cure.

The layer 42 includes a bondside surface which is the bondside surface 60 of the carcass 50 and a breezeside surface which is the passage-defining surface 26. The layer 44 includes a bondside surface which is the passage-defining surface 28 and a breezeside surface which is the breezeside surface 62 of the carcass 50. When the passages 30 are inflated, the surfaces 26 and 28 are in contact with the inflation fluid and when the passages 30 are deflated, the surfaces 26 and 28 are in contact with each other.

The layer 42 comprises a fabric ply 70 and coatings 72 and 74 on opposite sides thereof. The fabric ply 70 may comprise a RFL treated square-woven nylon fabric and the coatings 72 and 74 may comprise a suitable rubber. The layer 44 comprises a fabric ply 80 and coatings 82 and 84 on opposite sides thereof. The fabric ply 80 may comprise a RFL treated knit nylon fabric and the coatings 82 and 84 may comprise a suitable rubber. Coatings may be applied to both sides of the fabrics 70 and 80 with suitable coating and/or lamination procedures. This coating and/or lamination may be done prior to formation of the passages 30 and/or prior to a carcass pre-curing steps. Double-sided coatings may instead be accomplished by using a low viscosity coating on side of the fabric ply 70/80 which strikes through and coats the opposite side of the fabric ply during the pre-cure of the carcass 50 or the final cure of the deicer panel 20.

The coatings 74 and 84 form the passage-defining surfaces 26 and 28, respectively, of the illustrated deicer 10. When the passages 30 are inflated, the coatings 74 and 84 are in contact with the inflation fluid and when the passages 30 are deflated, the coating 74 and 84 are in contact with each other. In this manner, when moisture is introduced into the passages 30 during inflation, this moisture will not be absorbed by the fabric ply 70 and/or the fabric ply 80 and thus will not permeate through these layers. This protection against moisture absorption is believed to prolong the service life of the deicer 10.

Figure 5:
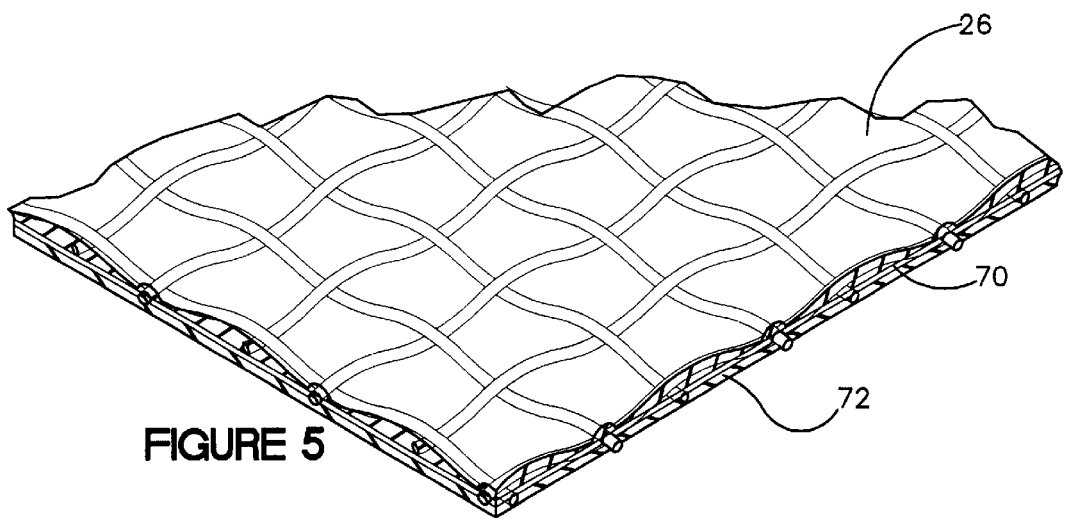
FIG. 5 is an enlarged plan view showing the texture of an inner surface of the carcass.

The coating 74 and/or the coating 84 may be texturized during assembly of the carcass 50 to provide the texture surface shown in FIG. 5. For example, a texturized peel ply could be provided during a carcass pre-curing step and then removed thereafter. In any event, by texturizing the coating 74 and/or the coating 84, flow-precluding contact between the passage defining surfaces 26 and 28 maybe prevented during deflation thereby minimizing the entrapment of inflation fluid. Thus, with appropriate texturing, the deicer 10 will "breathe" in the same manner as deicers having non-coated fabric passage-defining surfaces.

In the illustrated embodiment of the invention, both of the passage-defining surfaces 26 and 28 are coated with the moisture-impervious coating 74 and 84. However, in certain situations, coating only one of these surfaces may provide sufficient protection from moisture and enhance deicer life. For example, if moisture-induced damage is found to occur primarily on the bondside of the carcass 50 in a particular deicer design, coating the surface 28 but not the surface 26 may be sufficient. Likewise, if moisture-induce damage is found to occur primarily on the breezeside of the carcass 50 in a particular deicer design, coating the surface 26, but not the surface 28 may be sufficient.

By way of a particular example, the layer 40 may be 15 mil of a neoprene compound, the layer 42 may be 0.008 mil nylon square woven fabric coated on both sides with a natural rubber so that the coated fabric is approximately 0.013 mil, layer 44 may be 0.008 mil nylon knit fabric coated on both sides with a natural rubber so that the coated fabric is approximately 0.013 mil, layer 46 may be 20 mil natural rubber compound and layer 48 may be 15 mil of a neoprene compound.

One may now appreciate the present invention provides a deicer 10 which is protected against moisture-induced damage by moisture-impervious coatings 74 and 84 forming its passage-defining surfaces 26 and 28. Although the invention has been shown and described with respect to a certain preferred embodiment, it is obvious that equivalent and obvious alterations and modifications will occur to others skilled in the art upon the reading and understanding of this specification. The present invention includes all such alterations and modifications and is limited only by the scope of the following claims.

What is claimed is:

1. A deicer for breaking up and removing accumulated ice on an airfoil surface, said deicer comprising a bondside surface that is bonded to the airfoil surface, a breezeside surface on which the ice will accumulate, and passage-defining surfaces therebetween which define a plurality of expansible and contractible inflation passages; and wherein one of the passage-defining surfaces is formed by a bondside surface of a first fabric ply which is expandable and contractible and wherein the bondside surface of the first fabric ply has a moisture-impervious coating whereby moisture will not be absorbed by this passage-defining surface.

2. A deicer as set forth in claim 1, comprising a deicer panel which includes the bondside surface, the breezeside surface and the passage-defining surfaces, and means for introducing inflation fluid to and evacuating inflation fluid from the passages to expand and contract the inflation passages to break up and remove the accumulated ice.

3. A deicer as set forth in claim 2, wherein the panel comprises a carcass which includes the passage-defining surfaces and wherein the carcass includes a first layer and a second layer which are joined together to form the inflation passages.

4. In combination, an aircraft and the deicer of claim 1, wherein the bondside of the deicer is bonded an airfoil surface of the aircraft.

5. The combination of claim 4, wherein the airfoil surface is a leading edge of a wing of the aircraft.

6. A method of using the deicer of claim 1 to remove accumulated ice on an airfoil surface, said method comprising the steps of:
   bonding the bondside surface of the deicer to the airfoil surface; and
   introducing inflation fluid to and evacuating inflation fluid from the inflation passages to expand and contract the inflation passages to break up and remove the accumulated ice.

7. A method as set forth in claim 6, wherein said bonding step comprises bonding the bondside surface of the deicer to the leading edge of a wing of the aircraft.

8. A deicer as set forth in claim 1, wherein the moisture-impervious coating on the breezeside surface of the first fabric ply is texturized.

9. A deicer as set forth in claim 1, wherein the moisture-impervious coating on the bondside surface of the first fabric ply is rubber.

10. A deicer as set forth in claim 9, wherein the moisture-impervious coating on the bondside surface of the first fabric ply is natural rubber.

11. A deicer as set forth in claim 1, wherein the first fabric ply comprises a nylon knit fabric ply.

12. A deicer as set forth in claim 1, wherein the first fabric ply comprises a knit fabric ply, wherein the moisture-impervious coating on the bondside surface of the first fabric ply is rubber, and wherein the moisture-impervious coating on the bondside surface of the first fabric ply is texturized.

13. A deicer as set forth in claim 12, wherein another of the passage-defining surfaces is formed by a breezeside surface of a second fabric ply; wherein the breezeside surface of this second fabric ply has a moisture-impervious coating; wherein the second fabric ply comprises a square woven fabric ply; wherein the impervious coating on the breezeside surface of the second fabric ply is rubber; and wherein the moisture-impervious coating on the breezeside surface of the second fabric ply is texturized.

14. A deicer as set forth in claim 1, wherein another of the passage-defining surfaces is formed by a breezeside surface of a second fabric ply and wherein the breezeside surface of this second fabric ply has a moisture-impervious coating.

15. A deicer as set forth in claim 14, wherein the moisture-impervious coating on the breezeside surface of the second fabric ply is rubber.

16. A deicer as set forth in claim 15, wherein the moisture-impervious coating on the breezeside surface of the second fabric ply is natural rubber.

17. A deicer as set forth in claim 14, wherein the second fabric ply comprises a square woven fabric ply.

18. A deicer as set forth in claim 14, wherein the moisture-impervious coating on the breezeside surface of the second fabric ply is texturized.

19. A deicer as set forth in claim 14, wherein the second fabric ply comprises a square woven fabric ply, wherein the impervious coating on the breezeside surface of the second fabric ply is rubber, and wherein the moisture-impervious coating on the breezeside surface of the second fabric ply is texturized.

20. A deicer for breaking up and removing accumulated ice on an airfoil surface, said deicer comprising a bondside surface that is bonded to the airfoil surface, a breezeside surface on which the ice will accumulate, and passage-defining surfaces therebetween which define a plurality of expansible and contractible inflation passages; and wherein the passage-defining surfaces include a moisture-impervious coating whereby moisture will not be absorbed by the passage-defining surfaces;
    wherein the deicer further comprises a deicer panel which includes the bondside surface, the breezeside surface and the passage-defining surfaces, and means for introducing inflation fluid to and evacuating inflation fluid from the passages to expand and contract the inflation passages to break up and remove the accumulated ice;
    wherein the panel comprises a carcass which includes the passage-defining surfaces and wherein the carcass includes a first layer and a second layer which are joined together to form the inflation passages; and
    wherein the first layer comprises a first fabric ply and the moisture-impervious coating is on a breezeside surface of the first fabric ply and wherein the second layer comprises a second fabric ply and the moisture-impervious coating is on the bondside surface of the second fabric ply.

21. A deicer as set forth in claim 20, wherein the moisture-impervious coating on the breezeside surface of the first fabric ply is rubber.

22. A deicer as set forth in claim 20, wherein the first fabric ply comprises a RFL treated nylon square woven fabric.

23. A deicer as set forth in claim 22, wherein the moisture-impervious coating on the breezeside surface of the first fabric ply is natural rubber.

24. A deicer as set forth in claim 23, wherein the moisture-impervious coating on the breezeside surface of the first fabric ply is texturized.

25. A deicer as set forth in claim 20, wherein the moisture-impervious coating on the breezeside surface of the first fabric ply is texturized.

26. A deicer as set forth in claim 20, wherein the bondside surface of the first fabric ply is also coated with a moisture-impervious coating.

27. A deicer as set forth in claim 20, wherein the moisture-impervious coating on the bondside surface of the second fabric ply is rubber.

28. A deicer as set forth in claim 20, wherein the second fabric ply comprises RFL treated nylon knit fabric.

29. A deicer as set forth in claim 28, wherein the moisture-impervious coating on the bondside surface of the second fabric ply is natural rubber.

30. A deicer as set forth in claim 29, wherein the moisture-impervious coating on the bondside surface of the second fabric ply is texturized.

31. A deicer as set forth in claim 20, wherein the moisture-impervious coating on the bondside surface of the second fabric ply is texturized.

32. A deicer as set forth in claim 20, wherein the breezeside surface of the second fabric ply is also coated with a moisture-impervious coating.

33. A method of making the deicer of claim 20, comprising the steps of:
    coating the breezeside surface of the first fabric ply with the moisture-impervious coating;
    coating the bondside surface of the second fabric ply with the moisture-impervious coating; and
    assembling the first fabric ply and the second fabric ply together to form the carcass.

34. A method as set forth in claim 33, wherein said assembling step comprises sewing the first fabric ply and the second fabric ply together.

35. A method as set forth in claim 34, further comprising the step of pre-curing the carcass.

36. A method as set forth in claim 35, further comprising the step of texturing the breezeside surface of the first fabric ply and texturing the bondside surface of the second fabric ply during the pre-curing step.

37. A method as set forth in claim 33, wherein said assembly step is performed after said coating steps.

38. A method as set forth in claim 33, wherein said coating steps also include coating the bondside surface of the first fabric ply and coating the breezeside surface of the second fabric ply.

39. A method as set forth in claim 38, wherein at least one of the coating steps comprises coating one side of the fabric ply with a low viscosity coating which strikes through and coats the opposite side of the fabric ply during subsequent curing steps.

40. A deicer for breaking up and removing accumulated ice on an airfoil surface, said deicer comprising a bondside surface that is bonded to the airfoil surface; a breezeside surface on which the ice will accumulate; passage-defining surfaces therebetween which define a plurality of expansible and contractible inflation passages; a deicer panel which includes the bondside surface, the breezeside surface and the passage-defining surfaces; and means for introducing inflation fluid to and evacuating inflation fluid from the passages to expand and contract the inflation passages to break up and remove the accumulated ice;
    wherein the passage-defining surfaces include a moisture-impervious coating whereby moisture will not be absorbed by the passage-defining surfaces;
    wherein the first layer comprises a first fabric ply and the moisture-impervious coating is on a breezeside surface of the first fabric ply and wherein the second layer comprises a second fabric ply and the moisture-impervious coating is on the bondside surface of the second fabric ply;

wherein the first layer comprises a first fabric ply and the moisture-impervious coating is on a breezeside surface of the first fabric ply and wherein the second layer comprises a second fabric ply and the moisture-impervious coating is on the bondside surface of the second fabric ply; and wherein the first fabric ply comprises a RFL treated nylon square woven fabric and the moisture-impervious coating is natural rubber and wherein the second fabric ply comprises a RFL treated nylon knit fabric and the moisture-impervious coating is natural rubber.

41. A deicer as set forth in claim 40, wherein the moisture-impervious coating of the first fabric ply is texturized and wherein the moisture-impervious coating of the second fabric ply is texturized.

42. A deicer as set forth in claim 41, wherein the bondside surface of the first fabric ply is also coated with a moisture-impervious coating; and wherein the breezeside surface of the second fabric ply is also coated with a moisture-impervious coating.

43. A deicer for breaking up and removing accumulated ice on an airfoil surface, said deicer comprising a bondside surface that is bonded to the airfoil surface; a breezeside surface on which the ice will accumulate; passage-defining surfaces therebetween which define a plurality of expansible and contractible inflation passages; a deicer panel which includes the bondside surface, the breezeside surface and the passage-defining surfaces; and means for introducing inflation fluid to and evacuating inflation fluid from the passages to expand and contract the inflation passages to break up and remove the accumulated ice;

wherein the passage-defining surfaces include a moisture-impervious coating whereby moisture will not be absorbed by the passage-defining surfaces;

wherein the first layer comprises a first fabric ply and the moisture-impervious coating is on a breezeside surface of the first fabric ply and wherein the second layer comprises a second fabric ply and the moisture-impervious coating is on the bondside surface of the second fabric ply;

wherein the first layer comprises a first fabric ply and the moisture-impervious coating is on a breezeside surface of the first fabric ply and wherein the second layer comprises a second fabric ply and the moisture-impervious coating is on the bondside surface of the second fabric ply; and wherein the panel further comprises at least one layer adjacent the bondside of the carcass and at least one layer adjacent to a breezeside of the carcass.

44. A deicer as set forth in claim 43, wherein the at least one layer positioned adjacent the breezeside of the carcass comprises an elastomer which deforms to accommodate the inflation and deflation of the inflation passages.

45. A deicer as set forth in claim 44, wherein the panel comprises another layer adjacent the breezeside of the carcass and this other layer comprises a resilient layer.

* * * * *